March 8, 1955   L. E. RIEMENSCHNEIDER   2,703,480
PLURAL TEMPERATURE REFRIGERATED CABINET
Filed Sept. 7, 1950   2 Sheets-Sheet 1
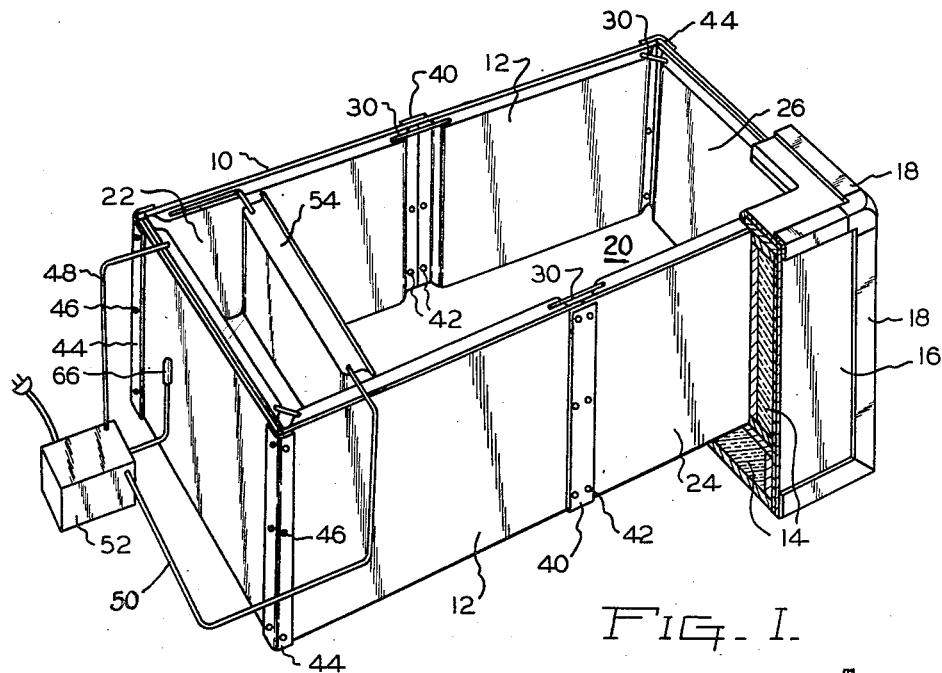
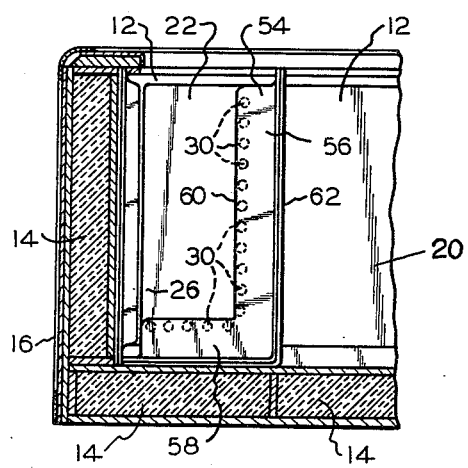
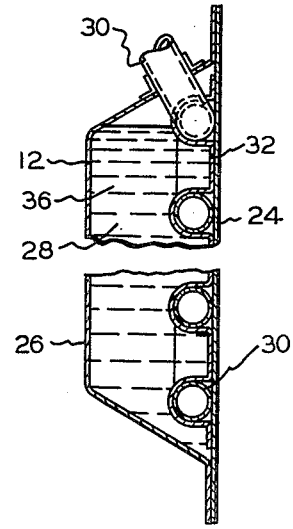
INVENTOR
LAWRENCE E. RIEMENSCHNEIDER
BY *Townsend F Beaman*
ATTORNEY March 8, 1955 L. E. RIEMENSCHNEIDER 2,703,480
PLURAL TEMPERATURE REFRIGERATED CABINET
Filed Sept. 7, 1950 2 Sheets-Sheet 2
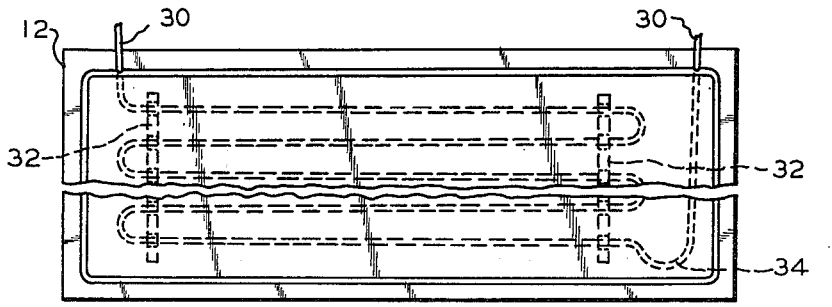
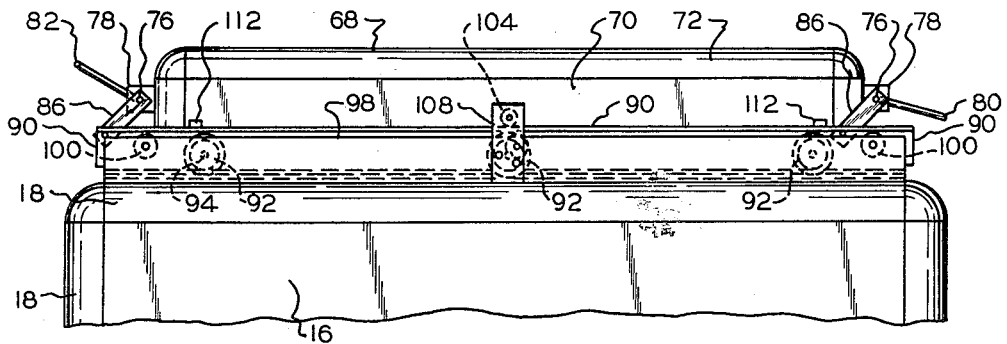
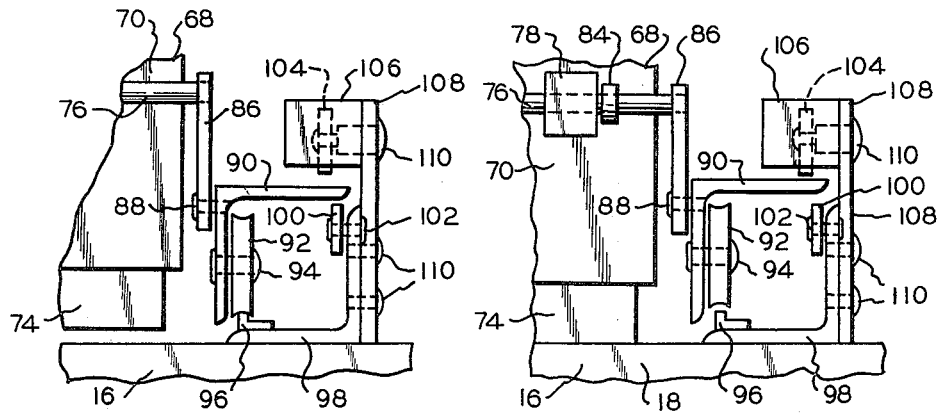
INVENTOR
LAWRENCE E. RIEMENSCHNEIDER
BY
ATTORNEY `United States Patent Office`

2,703,480
Patented Mar. 8, 1955

2,703,480

PLURAL TEMPERATURE REFRIGERATED CABINET

Lawrence E. Riemenschneider, Chelsea, Mich.

Application September 7, 1950, Serial No. 183,629

4 Claims. (Cl. 62—4)

This invention relates to refrigerating apparatus and is addressed principally to the provision of a refrigerator storage cabinet and mechanism which has the capacity and size sufficient to freeze and store a one-year's supply of food. Such a refrigeration apparatus should also have the ability to store food for long periods of time, such as a full year or longer, without appreciable deterioration of the food product during the storage period.

At the present time, food freezing and storage cabinets and mechanisms are constructed to obtain a comparatively low temperature in the food, to hold that temperature within about 5° of variation. These devices are presently constructed without a full knowledge and appreciation of the laws of food chemistry. Accordingly, food placed in such devices spoils and deteriorates at varying rates, depending upon the chemical composition of the food, and at rates which prevent the use of such devices for preserving food for periods of one year or longer.

Temperature fluctuation in the usual home freezer is due principally to several factors. The first of these is compressor cycling, by which is meant the turning off and on of the compressor in response to temperature fluctuations necessary to actuate the control, the operation of the compressor resulting in the cooling of the inside of the device. The temperature in the box is allowed to rise several degrees from the low temperature desired, at which time the control operates and energizes the compressor to pull the temperature back down, from which point it is allowed to slowly rise several degrees and the process is repeated. This continual raising and lowering of the temperature within the box, even though confined to a few degrees, causes mixing and stirring of the mass of food therein, which speeds up the enzyme reaction.

A second source of temperature fluctuation is the result of the opening and closing of the door of the box during normal use thereof. In the case of frozen food storage boxes having a vertical door, such as the ordinary refrigerator, the opening of the door immediately allows a tremendous volume of cold air to spill out of the box, while warm air is allowed to enter at the top of the box. The temperature loss is not confined to this initial displacement of air, for as the warm air enters at the top of the box it is immediately chilled and spills down out the bottom, being replaced by additional warm air which is again chilled. This cycle operates until the door is closed, and adds many units of heat to the inside of the cabinet and to the food stored there, thereby causing extreme temperature fluctuation. In the case of a cabinet having a horizontal door, in the top thereof, the opening and closing of the door on a hinge, about which the door rotates, results in a pumping action which pulls the cold air up out of the box, allowing warm air to replace the same, and pumps warm air back down into the box when the door is closed.

A further source of temperature fluctuation is the loading of the storage compartment with warm food. Necessarily, this food must contain a large number of heat units, which heat units will be removed from that food by the surrounding colder foods and cold walls, and is removed therefrom by the compressor. Since the compressor acts purely as a heat pump, and since the temperature within the box will tend to stabilize, the loading of the box with warm food will necessarily raise the temperature of the stored food, thereby increasing the enzyme reaction by reason of the increased temperature, as well as by reason of the stirring of the mass as the temperature is raised.

A fourth source of temperature fluctuation results from interruption of the operation of the compressor, either due to power failure or mechanical failure of the compressor itself. In the ordinary frozen food storage cabinet, these power and mechanical interruptions are felt practically immediately, which results in the speeding up of the enzyme reaction.

A further objection to the conventional type of freezer cabinet is found in the dehydration of the frozen food during the freezing and storage period, particularly the latter, which dehydration generally is referred to as "freezer burn." Dehydration of frozen food is caused by a temperature differential, sometimes varying, between the cold wall of the cabinet, and the food itself. This temperature differential causes air currents to be set up inside the storage compartment, whereby air contacts the cold wall of the cabinet, is chilled, flows downward, and outwardly over the stored food, is warmed by the stored food and rises, and then returns to the cold wall, where it is again chilled and again falls to the bottom of the cabinet. The air chilled by the cold wall is colder than the stored food, and the vapor pressure within the food is higher than the vapor pressure in the cold air. This results in the vapor in the food being forced out of the food and being picked up by the air, by means of which it is deposited, in the form of crystals, on the cold wall of the cabinet. Repeated cycling of this air over the food and the cold wall results in the dehydration of the food and the withdrawal of the moisture therein and its deposit on the walls of the cabinet. The method which I propose to use to cure this defect in frozen food storage structures is to obtain a balance of temperature between the cold wall of the cabinet and the stored food, so that there is no air movement within the storage compartment, and, therefore, no difference in vapor pressure between the stored food and the surrounding air. Once the temperature differential is eliminated, the vapor pressure is equalized between the stored food and the surrounding air, and dehydration ceases.

Another objection to the present food freezing cabinet is the large amount of air circulation which takes place during the freezing of food in the so-called freezing compartment. The reason for this air movement is that the heat units are extracted from the food by convection, rather than by conduction. I, therefore, propose to provide a freezing compartment of a size and shape which will allow almost all of the heat to be removed from food which is being frozen by conduction rather than by convection, thereby practically eliminating the movement of air in the freezing compartment and the concomitant dehydration during the freezing period. A further advantage is that the freezing takes place at a much faster rate with conduction heat transfer rather than convection transfer, since the metal walls of the freezing compartment are much better conductors of heat than is the air in the compartment.

To solve the problems stated above, I have supplied a frozen food freezing and storage cabinet having a relatively small freezing compartment and a relatively large storage compartment, the walls of which are constituted by tank sections containing a eutectic fluid which acts as a barrier to heat passage, and which functions as a refrigeration storage vault, the two compartments being closed by a horizontal top door which is moved in such a fashion as to eliminate all pumping action.

It is, therefore, an object of this invention to provide a food freezing and storage cabinet in which can be maintained a very low temperature with only minute variations thereof.

Another object is to provide a food freezing and storage cabinet having an access door which retains the cold air within the compartment, rather than pumping the same out.

A further object is the provision of a food freezing and storage cabinet having means wherein warm food may be inserted for freezing without raising the temperature of the storage compartment.

A further object is to provide a food freezing and storage cabinet employing stored refrigeration to minimize, and possibly eliminate, the effect of power and mechanical interruptions of the operation of the compressor.

A further object is to provide a food freezing and storage compartment wherein the food is not dehydrated during the freezing and/or storage periods.

A further object of the invention is to provide a food freezing and storage cabinet, the walls of which are constituted by tanks containing a eutectic solution and evaporator coils, the coils being positioned to respond to increases in temperature at the outside of the tank, thereby eliminating the problem of compressor cycling.

A further object is to provide a food freezing and storage cabinet having the capacity to freeze a large volume of food at a very fast rate by the use of stored refrigeration, the freezing rate not being controlled by the small compressor used to pump the heat from the food to the outside atmosphere.

A further object is to provide cold wall structure for a food freezing and storage cabinet wherein the effective coil area of the evaporator coils is increased substantially by the employment of a eutectic filled tank wherein the evaporator coil is mounted.

Further objects and advantages of my invention will be apparent from a consideration of the following specification and the appended claims, in connection with the accompanying drawings, wherein Fig. I is a view in perspective, with various parts broken away, of a food freezing and storage cabinet constructed according to my invention, Fig. II is a sectional view of a portion of the cabinet showing the construction of the barrier wall between the freezing compartment and the storage compartment, Fig. III is a broken view in section of the typical wall structure of the apparatus, Fig. IV is a broken view in elevation of one of the tank units used as a cold wall, Fig. V is a broken view in elevation of the end of the cabinet, showing the door lifting and moving apparatus, Fig. VI is a broken view in elevation of the side of the door lifting apparatus, showing the door in sealed contact with the top of the cabinet, and Fig. VII is a view similar to Fig. VI, but with the door being lifted way from the top of the cabinet structure.

The food freezer and storage cabinet 10 is constructed with a plurality of tank walls 12 enclosed within suitable insulation 14 inside a finished cabinet 16. The cabinet 16 may be formed as desired, and may include the trim moldings 18 as shown. The insulation 14 should be the most efficient economically available, so that the wall structure is not unnecessarily thick, thereby keeping the overall dimensions of the cabinet 16 smaller, or making possible larger storage and freezing compartments.

The tank walls 12 are formed as shown most clearly in Figs. III and IV, and have an outside wall 24 and an inside wall 26, joined together in sealed relationship and providing an internal tank space 28. The evaporator coil 30 is mounted within the tank space 28 and adjacent the outside wall 24 by means of the formed members 32 as shown. The evaporator tube is preferably coiled from top to bottom as shown in Fig. IV. It is advisable to incorporate the sump or low spot 34 into the coil structure to serve as a moisture trap in the line, so that moisture may be concentrated in one spot and blown out with the cycling of the compressor. The tank space 28 is filled with a eutectic fluid 36 of known fusion characteristics.

With the tank 12 constructed as described above, and mounted with the wall 24 adjacent the insulation 14 and with the wall 26 situated at the inside of the structure, it will be appreciated that the evaporator tubing 30 is positioned adjacent the outside or warm wall of the tank 12. With this construction, heat units may be pumped by means of the evaporator tubing 30 out of the eutectic fluid 36 so that the temperature of the eutectic fluid 36 may be lowered to its fusion point, thereby making the entire inside wall 26 an extremely cold wall. The entire wall 26 then acts as effective coil area in helping the evaporator coil 30 to pump heat from the inside of the box. Likewise, with this construction, heat entering the cabinet through the insulation, and from the outside ambient air, passes through the wall 24 and tends to liquify the eutectic fluid 36 immediately adjacent the wall 24. At this juncture, of course, the evaporator coils, when the compressor is operating, will pump this heat from the area adjacent the wall 24 out through the compressor, thereby returning the eutectic fluid 36 to its fused condition. This means that heat units attempting to get into the inside of the box 10 must pass through the barrier provided by the eutectic fluid 36, and, accordingly, cannot pass through the wall 26 until the entire volume of the eutectic fluid 36 has been raised to a temperature above its fusion point. Such a situation, of course, cannot transpire if the evaporator tube 30 and the compressor are functioning. There will, therefore, be no heat loss through the tanks 12, and the wall 26 will be maintained at a constant temperature.

The tanks 12 are constructed with the walls 24 and 26 approximately one inch apart to form the tank space 28 for the ideal size food freezing and storage cabinet. A plurality of tanks 12 may be attached together, as shown in Fig. I, to form the inner liner of the cabinet 10. I have shown, in Fig. I, an example werein two tanks 12 are used on each side of the cabinet 10, and one on each end. It must be appreciated that this arrangement may vary, that the side walls may be formed of a single tank, of larger or smaller size, and that ideally a plurality of eutectic tanks 12 should be used in the floor 38 to prevent heat loss through the floor and the insulation thereunder. However, the apparatus will function satisfactorily without the use of the tanks 12 upon the floor 38, and the use of additional tanks 12, of course, increases the cost of the device proportionately.

As shown in Fig. I, the tanks 12 may be joined together by the strip members 40 having suitable fastening means 42, and by the angled corners 44 with their fastening means 46. The evaporator tube 30 is connected from one tank to the next, in series, from the inlet portion 48 to the outlet portion 50, each of the latter being suitably connected to the compressor 52.

The freezing compartment 22 is separated from the storage compartment 20 by a specially designed eutectic tank 54 having a vertical section 56 and a horizontal section 58. It will be appreciated from Fig. II that the tank 54 is much thicker than the tank 12, and that it will therefore contain a much larger volume of eutectic fluid 36. I construct the tank 54 with the inner wall 60 spaced about three inches from the outer wall 62, and position the horizontal portion 58 at the bottom of the freezing compartment 22 to speed the freezing of food placed therein. Likewise, the evaporator coil 30 in the tank 54 is positioned adjacent the wall 60 so that, as heat penetrates through the wall 60 it is immediately pumped out through the evaporator coil 30 with only a slight chance of the heat passing through as far as the wall 62. The vertical portion 56 of the tank 54, therefore, constitutes a barrier between the compartment 20 and the compartment 22, as well as a storage place for a large amount of refrigeration. Consequently, when warm food is placed in the restricted confines of the freezing compartment 22, the heat therefrom immediately starts changing the state of the eutectic fluid within the tank 54, as well as within the adjacent tank 12, and the evaporator tube 30 begins pumping off this heat through the compressor 52. The tank 54 is constructed of a size sufficient to contain enough stored refrigeration in the form of the eutectic fluid 36 to remove all of the undesired heat from any amount of food which it is possible to place within the confines of the compartment 22. The compartment 22 is small and also quite narrow, but is large enough to hold a quarter of beef, or a case of berries, etc. Since the compartment 22 is relatively narrow, the food placed therein will usually contact the walls 60 and 26, thereby removing the heat from the food by conduction, rather than by convection. This speeds up the freezing process, but the volume of the eutectic fluid within the tank 54 is so great as to remove all of the undesired heat units from the food placed therein without all of the eutectic fluid 36 melting. This, of course, will maintain the temperature of the wall 62 at the fusion point of the eutectic 36. Therefore, the loading of the freezing compartment 22 will not raise the temperature within the storage compartment 20.

The compressor 52 is preferably mounted outside the main cabinet structure and adjacent one end thereof, and the evaporator coils 30 are suitably connected thereto by the lines 48 and 50. A control of the temperature responsive type may be mounted adjacent thereto, with the temperature bulb 66 mounted in a suitable position. I have found that, with the proper adjustment, the temperature bulb 66 is very effective in controlling temperature inside the box, when it is mounted in the insulation 14, outside the wall 24, and approximately one inch therefrom. With this arrangement, and with the insulation 14 packed around the wall 24, the insulation 14 is necessarily somewhat cool. When the insulation 14 becomes warmer, it is a warning that the eutectic fluid 36 adjacent the wall 24 may be beginning to melt, and that the compressor 52 should then pump the heat units out of the eutectic adjacent the wall 24. It will be found, however, that other types of controls are available, and may be satisfactorily used with this structure.

An appreciation of the structure described above will bring the realization that it will eliminate three of the four sources of temperature fluctuation which have been problems in food freezing and storage cabinets. With the evaporator coil structure 30 positioned adjacent the outside wall 24 of the eutectic tank 12, compressor cycling will not effect the temperature of the wall 26, for the eutectic fluid 36 which might melt will be adjacent the wall 24, and not adjacent the wall 26. This will completely eliminate the effect of compressor cycling, and heat leakage. This structure will, likewise, minimize dehydration, for the wall 26 will thereby be retained at a constant temperature, probably with absolutely no variation, thereby making it possible to get the air within the compartment at the same temperature as the wall 26, which eliminates air movement and the associated differences in vapor pressure which cause dehydration of food. The walls thus constructed also provide a barrier against heat leakage into the box, since the outside heat cannot get into the box without going through the entire eutectic mass and changing the state thereof through the heat of fusion point.

Likewise, with the tanks constructed as described above, and as shown, there is sufficient eutectic fluid contained therein to provide approximately four days of refrigeration, without the compressor operating at all. In other words, with the box in normal use, should the electric power for the compressor be interrupted, or should the compressor fail, it would take approximately four days, with an ambient temperature of 70°, for normal heat loss to change the state of the eutectic fluid 36, through the heat of fusion, at the end of which time the temperature within the compartments 20 and 22 would begin to rise.

The specific construction of the tank 54 prevents temperature fluctuation by reason of warm food loading in the freezing compartment 22. The tank 54 operates as a barrier to heat loss into the storage compartment 20, it being impossible for heat to pass through the vertical portion 56 of the tank 54 without changing the state of all of the eutectic fluid 36 contained therein.

To minimize the temperature fluctuation caused by the pumping action of the usual door on devices of this type, I have provided a novel door mounting which permits the lifting of the door only a fraction of an inch, sufficient to allow the door to move horizontally, without interference, together with a roller track arrangement whereby the door may be rolled from side to side of the cabinet 10, thereby eliminating the pumping action. In Figs. V, VI, and VII, I have shown the door 68 positioned horizontally at the top of the outside cabinet 16, being formed with suitable outside wall structure 70 and finished with the moldings 72. The door 68 is filled with insulation similar to that used in the rest of the cabinet, and carries on its lower edge a sealing flange 74 of a material such as sponge rubber, which mates with the top of the cabinet 16 to provide an air tight seal therewith. In the lowered position, as shown in Figs. V and VI, the door rests on the sealing flange 74, its entire weight being withdrawn from the track structure.

Mounted along each side of the door 68 is a rod member 76 carried in blocks 78, and being attached to the handles 80 and 82. The rods 76 are provided with collars 84 which restrict longitudinal movement thereof, and are rigidly attached to the crank arms 86 which are in turn pivotally mounted by the studs 88 to the upper track members 90. With this structure it will be appreciated that the raising of the handle 80 or the lowering of the handle 82 will rotate the rods 76 and the crank arms 86, thereby placing the weight of the door 68 on the pivots 88 and the upper track members 90. Track member 90 is provided with a plurality of channeled wheels 92 mounted on axles 94 in position for engagement with the track portion 96 of the lower track member 98. When the weight of the door 68 is transferred from the resilient flange 74 to the track 90, it is borne by the track member 96 and the wheels 92. In this condition, the door 68 may be rolled backward and forward across the track 98, thereby exposing the chambers 20 and 22.

Since the door 68 is of very heavy construction, I have provided the rollers 100, mounted on axles 102 for engagement with the underside of the track 90 when the door 68 is rolled out a sufficient distance to disengage the wheels 92 from the track portion 96. To further support the door 68, in either of its extended positions, I have provided a roller 104 mounted in a block 106 which is in turn carried by an upright 108 and by the lower track member 98, the entire assembly being held together by a suitable fastening means 110. The roller 104 bears the torque load of the door 68 in either of the extended positions. The stop members 112 are situated for engagement with the block 106 and function to prevent the door 68 from running clear off the track in either of its extended positions.

By reason of the fact that the crank arms 86 are positioned parallel to each other, either the raising of the handle 80 or the lowering of the handle 82 will result in the door being lifted away from engagement with the top of the cabinet structure 16, in which position it may be easily rolled toward either side of the cabinet, thereby exposing approximately half of the compartments 20 and 22. Since the door is raised only a very short distance, there is only a negligible pumping action, thereby retaining the refrigerated air within the compartments, as desired. The door structure, thus, will minimize the fourth source of temperature fluctuation.

Having described my invention, what I claim as new and desire to protect by Letters Patent is:

1. In a food freezing and storage apparatus having a plurality of insulated walls, a plurality of refrigerating walls mounted adjacent said insulating walls and defining a compartment, and a refrigeration compressor operatively associated with said refrigerating walls, the provision of a barrier wall adapted to be positioned within said compartment to separate the same into a freezing compartment and a storage compartment, said barrier wall comprising a tank having a plurality of wall sections, an evaporator coil positioned within said tank and mounted substantially adjacent its wall section adjoining the freezing compartment and spaced from its wall section adjacent the storage compartment, said evaporator coil being operatively associated with said compressor, and a quantity of eutectic solution positioned within said tank and adapted to be chilled by the action of said evaporator coil.

2. In a food freezing and storage cabinet having a plurality of insulated walls defining a refrigerated compartment and means for refrigerating said compartment, the provision of a barrier wall adapted to define a freezing compartment within said first compartment comprising a tank member of L-shaped cross-section, the horizontal arm of the L disposed to form a floor for the freezing compartment and the vertical arm of the L disposed to separate the freezing compartment from the remainder of said first compartments, said tank having an inner wall adjacent the freezing compartment and an outer wall remote from said inner wall, a quantity of eutectic fluid disposed within said tank, and an evaporator coil operatively associated with a compressor and mounted within said tank and directly adjacent the inner wall of said tank and spaced from the outer wall.

3. In a food freezing and storage cabinet having a plurality of insulated walls defining a refrigerated compartment and means for refrigerating said compartment, and provision of a barrier wall adapted to define a freezing compartment within said first compartment comprising a tank member of L-shaped cross-section, the horizontal arm of the L disposed to form a floor for the freezing compartment and the vertical arm of the L disposed to sepaarte the freezing compartment from the remainder of said first compartment, a quantity of eutectic fluid disposed within said tank, and an evaporator coil operatively associated with a compressor and positioned within said tank.

4. A refrigerating apparatus for the preservation of food products in a frozen state over long periods of storage comprising a refrigerant compressor, evaporator structure operatively connected to said compressor, thermostatic means operatively connected to said compressor for cyclic operation thereof, a storage chamber having an insulated exterior wall, a eutectic tank defining an inner liner of said chamber, an outer wall of said tank being adjacent said insulated exterior wall, said thermostatic means being located between said insulated exterior wall and the outer wall of said tank, said evaporator structure being disposed adjacent said outer wall of said tank and spaced from said inner wall, a eutectic solution in said tank defining a heat barrier of substantial thickness as compared to said evaporator structure and being substantially disposed to one side of said evaporator structure whereby said thermostatic means is responsive solely to the temperature condition existing between said evaporator structure and said insulated exterior wall and temperature conditions within the interior of said chamber defined by said tank remains substantially constant and relatively unaffected by the cyclic operation of said compressor.

References Cited in the file of this patent

UNITED STATES PATENTS

| Number | Name | Date |
|---|---|---|
| 1,743,531 | Clarkson | Jan. 14, 1930 |
| 2,012,308 | Heitman | Aug. 27, 1935 |
| 2,043,191 | Carpenter | June 2, 1936 |
| 2,047,326 | King | July 14, 1936 |
| 2,047,462 | Doyle | July 14, 1936 |
| 2,052,407 | King | Aug. 25, 1936 |
| 2,058,924 | Tiffany | Oct. 27, 1936 |
| 2,191,198 | Gould | Feb. 20, 1940 |
| 2,223,023 | Weilemann | Nov. 26, 1940 |
| 2,327,355 | Kleist | Aug. 24, 1943 |
| 2,428,312 | Herbener | Sept. 30, 1947 |